United States Patent [19]

Egger et al.

[11] Patent Number: 4,912,832
[45] Date of Patent: Apr. 3, 1990

[54] METHOD FOR MAKING A TIMEPIECE STEPPING MOTOR

[75] Inventors: Joseph Egger, Pforzheim; Fritz Brenk, Kampfelbach/Bilfingen, both of Fed. Rep. of Germany

[73] Assignee: Timex Corporation, Waterbury, Conn.

[21] Appl. No.: 355,865

[22] Filed: May 22, 1989

Related U.S. Application Data

[63] Continuation of Ser. No. 281,165, Dec. 8, 1988, abandoned.

[51] Int. Cl.⁴ ............................................. H02K 15/00
[52] U.S. Cl. ........................................ 29/596; 29/418; 156/152; 156/256; 156/268; 156/305; 219/121.67; 219/121.72; 310/40 MM; 310/49 R; 368/156
[58] Field of Search .................. 29/596, 418; 156/152, 156/256, 268, 305; 264/272.19, 272.2; 219/121.67, 121.72; 310/40 MM, 49 R; 368/156, 160

[56] References Cited

U.S. PATENT DOCUMENTS 3,949,251  4/1976  Takatsuki ........................ 310/49 R
3,978,651  9/1976  Yoshino .............................. 58/23
4,795,930  1/1989  Schwartz et al. ..................... 310/49

FOREIGN PATENT DOCUMENTS 75560  5/1982  Japan ............................... 310/49 R
127554  7/1983  Japan ............................... 310/49 R
54293  3/1985  Japan ............................. 219/121.72

Primary Examiner—P. W. Echols
Attorney, Agent, or Firm—William C. Crutcher

[57] ABSTRACT

Method for manufacturing a timepiece stepping motor comprising the steps of: providing a flat one-piece stator member defining an opening for the rotor and having a pair of diametrically opposed narrow sections on either side of the opening; providing a movement frame having stator locating projections and defining a pair of holes larger than the narrow sections and extending through the movement frame; locating and attaching the stator to the frame with the narrow sections spanning the holes in the frame; cutting through the narrow sections with a laser to sever the stator into two members, utilizing the holes in the frame to dispose of vaporized metal from the stator; encapsulating and re-joining the severed sections with a plastic fixation; and attaching a coil core assembly to the stator members and in magnetic circuit therewith.

5 Claims, 4 Drawing Sheets

METHOD FOR MAKING A TIMEPIECE STEPPING MOTOR

This is a continuation of U.S. patent application Ser. No. 281,165, filed Dec. 8, 1988, now abandoned.

BACKGROUND OF THE INVENTION

This invention relates generally to a quartz analog movement for timepieces of the type utilizing a Lavet stepping motor, and more particularly it relates to an improved method for manufacturing the stepping motor for a wrist watch.

A stepping motor of the Lavet type consists of a coil winding with a core member of magnetizable material and a stator forming a magnetic path for the flux and terminating in two semi-circular pole shoes which cooperate with a rotor having a permanent magnet. Periodic pulses of current to the coil step the rotor which turns the hands of the wrist watch through a gear train. Originally the stators were made in two pieces separated by a narrow air gap, together with notches or cut-outs in the pole shoes which would cause the rotor to assume a preferred rest position between steps. Because of the small size of a wrist watch and very close clearances required, it was very difficult to properly position the stator members with respect to one another and with respect to the rotor. For example, U.S. Pat. No. 3,949,251-Takatsuki (Daini Seiko) describes a stepping motor with off-set stator halves which are positioned by pivoting them against a positioning ring. Another construction is shown in U.S. Pat. No. 3,978,651-Yoshino (Suwa Seiko) describes a two piece stator construction for a stepping motor using off-set stator pieces which are attached to a coil bobbin and core piece. The two stator halves are pivotably mounted on a reference plate. The reference plate is then affixed to the watch frame after the stator parts are assembled to it. This patent suggests that the stator plate might be mounted to the reference plate as a single one-piece stator and then cut apart to form a two-piece stator.

Other prior art patents showing two-piece stepping motors are seen in U.S. Pat. Nos. 3,984,972-Yoshino and 2,704,334-Brailsford.

Because of the difficulties in getting the two stator halves into proper position in the watch frame, one-piece stators were suggested. One of these is seen in U.S. Pat. No. 4,398,107-Fukushima (Daini Seiko) with a region of reduced cross sectional area which magnetically saturates in lieu of an air gap. While this reduces the number of parts, the performance of the motor is dependent upon manufacturing accuracy in producing the regions of reduced cross sectional area, sometimes requiring special materials or increased manufacturing costs. For example, in U.S. Pat. No. 4,361,772 -Fukushima, a stator piece of low saturated magnetic flux density must be used in order not to require too high a percentage of magnetic flux (with consequent loss) to saturate the regions of reduced cross-sectional area.

It would be desirable to provide the manufacturing convenience of a one-piece stator which is combined with the improved operating performance to be expected with a two-piece stator.

Accordingly, one object of the present invention is to provide an improved manufacturing method for a timepiece stepping motor which reduces its cost.

Another object of the invention is to provide an improved timepiece movement and method of manufacture which will reduce the cost of the movement.

SUMMARY OF THE INVENTION

Briefly stated, the invention comprises an improved method for manufacturing a timepiece stepping motor comprising the steps of: providing a flat one-piece stator member defining an opening for the rotor and having a pair of diametrically opposed narrow sections on either side of said opening; providing a movement frame having stator locating means and defining a pair of holes larger than said narrow sections and extending through the movement frame; locating and attaching the stator to the frame with the narrow sections spanning said holes in the frame; cutting through said narrow sections with a laser to sever the stator into two members, utilizing the holes in the frame to dispose of vaporized metal from the stator; encapsulating and re-joining the severed sections with a plastic fixation; and attaching a coil core assembly to said stator members and in magnetic circuit therewith.

DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing, in which:

FIG. 1 is a plan view of a typical timepiece movement manufactured by the present invention, FIG. 2 is a developed cross sectional view of the movement of FIG. 1, taken along lines II—II, FIG. 3 is a plan view of the movement frame having the stator attached therein prior to cutting, FIG. 4 is a cross sectional view taken through the frame section of FIG. 3 along lines IV—IV, FIG. 5 is a plan view of a portion of the stator after cutting, and FIG. 6 is a plan view of the same portion of the stator after plastics encapsulation of the severed stator ends.

DESCRIPTION OF THE PREFERRED EMBODIMENT

Figure 1:
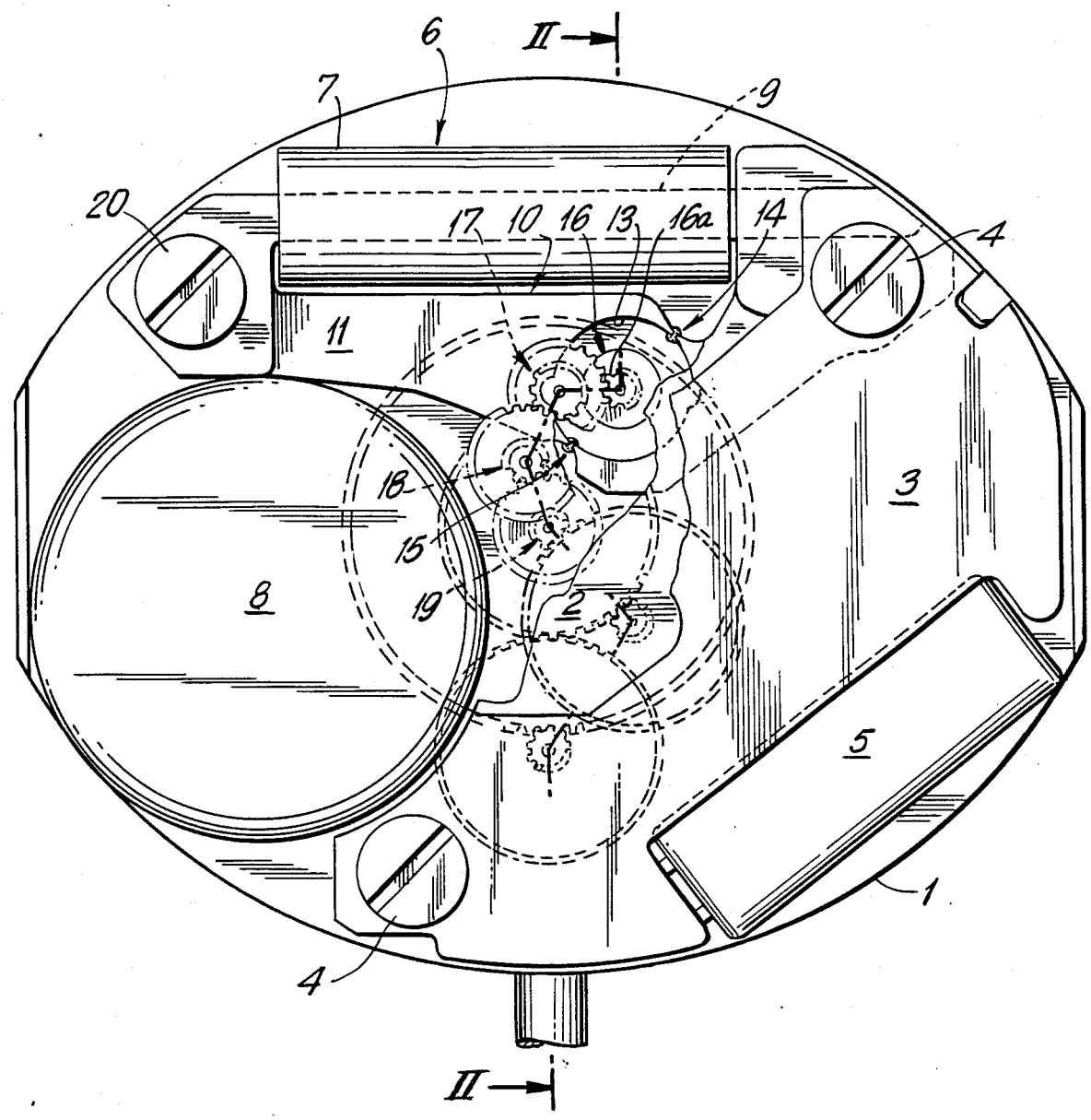

Referring now to FIG. 1 of the drawing, a watch movement comprises a plastic frame member, the outline of which is seen at reference 1, which serves as the main structural member of the movement of a three-hand quartz analog wristwatch. Frame 1 is molded of polycarbonate or similar plastics material and is partially covered on the backside of the movement facing the viewer by a plastic bridge member 2. Frame 1 and bridge 2 serve to rotatably journal between them members of the gear reduction train. Since bridge 2 would normally obscure the gear members, it has been cut away in the drawing in order to reveal the more essential features of the invention.

A printed circuit board 3 is mounted on top of bridge 2 by means of screws 4. A quartz crystal 5 is connected to terminals (not shown) beneath the printed circuit board. The printed circuit board carries an integrated circuit (not shown) which provides periodic driving pulses, preferably one per second, to a stepping motor shown generally at 6. The stepping motor is of the Lavet type and includes a coil 7 connected to receive the periodic energizing pulses from the integrated circuit. Power is supplied to the integrated circuit by an energy cell 8.

A path for magnetic flux is provided by a flat L-shaped core piece 9 and by a flat underlying stator plate 10. Stator 10 is of soft magnetizable iron with low hysteresis loss and high permeability and is initially a single piece. Upon completion of the manufacturing method of the present invention stator 10 consists of two members 11, 12 which together define between them a circular opening 13 separated by two narrow air gaps 14, 15, which, in turn, have been encapsulated by plastic fixation bridging gaps 14, 15 (See FIG. 6).

Disposed in the opening 13 is a stepping motor rotor 16 with pinion 16a engaging a first gear assembly 17, which drives a second gear assembly 18, which drives a center gear assembly 19 to step the second hand of the watch. Additional gear reductions not described are included to rotate the minute hand and hour hand.

When the movement is assembled, a coil core assembly consisting of coil 7 and core member 9 of the same material as stator 10 is laid on top of stator 10 and held at one end by a screw 20. Subsequently, the rotor and gear members are placed in a frame and the bridge 2 and circuit board 3 attached by means of screws 4. The bridge 2 holds the other end of core member 9 against stator 10 to complete a path for magnetic flux.

Figure 2:
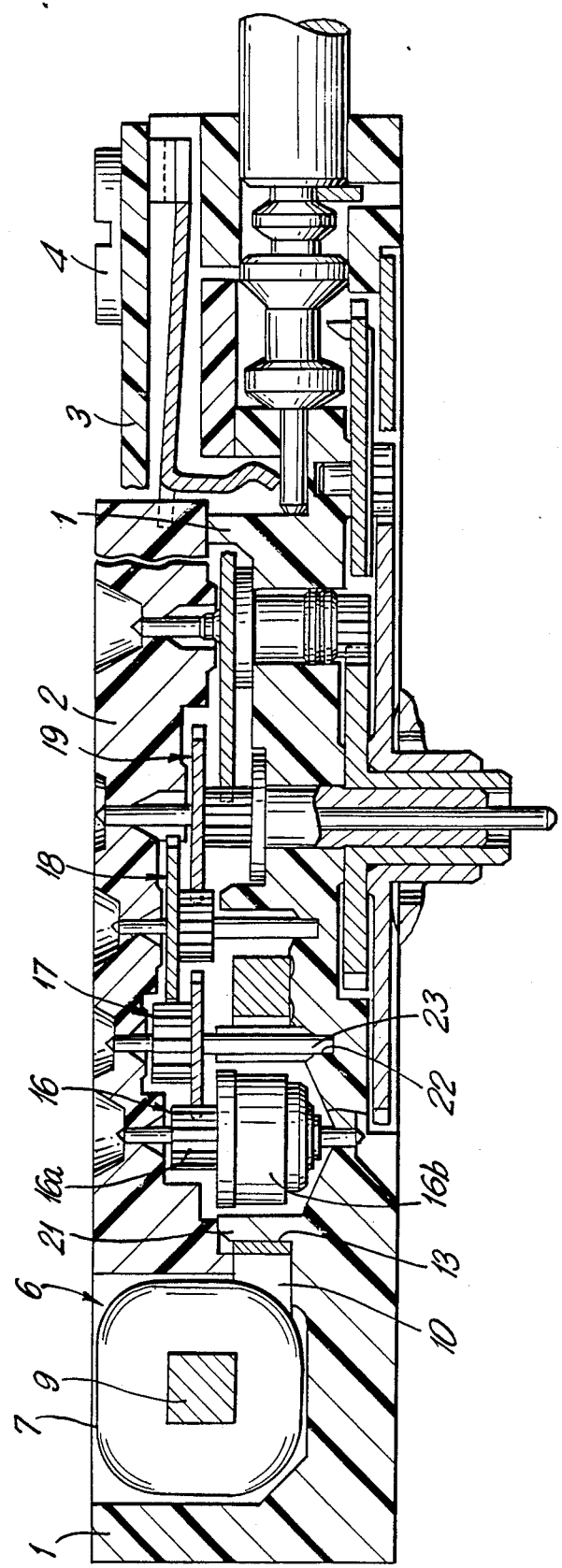

Referring to FIG. 2 which is a cross-section of the assembled movement shown in FIG. 1, the assembly of members can be seen. Stator 10 is located in the frame 1 by means of an integral plastic wall 21 which passes through the central opening 13 of the stator. Rotor 16 includes a permanent magnet 16b located inside the stator opening 13 within the wall 21 and coaxial therewith. In the present movement, although not material to the present invention, the first gear assembly 17 is journaled in a pocket bearing 22 by means of an extended stem 23 which passes through wall 21. This movement and variations of it are described in U.S. Pat. No. 4,744,066 issued May 10, 1988 to Herbert Schwartz and assigned to the present assignee, this patent being incorporated herein by reference.

Figure 3:
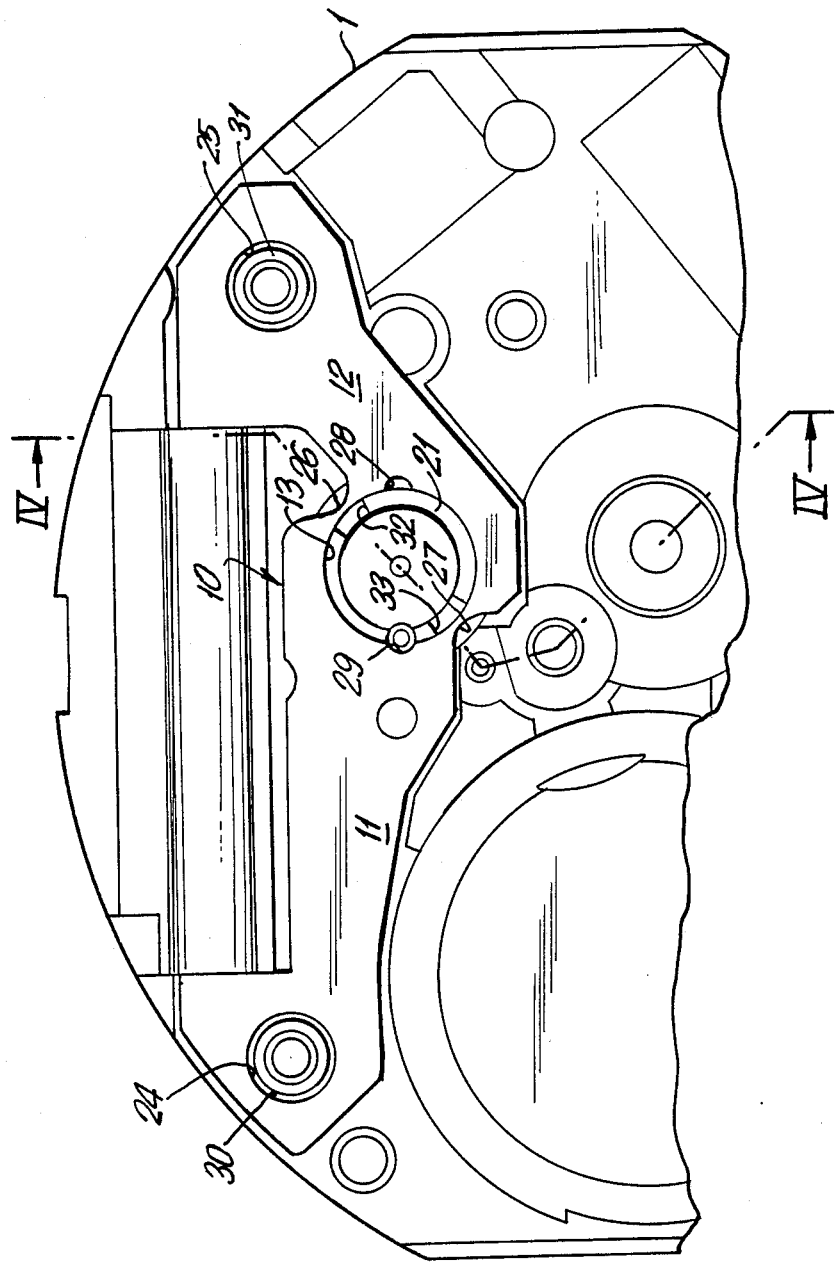

In accordance with the manufacturing method of the present invention, stator member 10 is first assembled as a single piece into the plastic frame member 1 as shown in FIG. 3. The stator member comprises a flat plate with holes 24, 25 at opposite ends forming two major sections 11, 12 on either side of a central hole 13. Sections 11, 12 are joined by diametrically opposed thin sections 26, 27 and have diametrically opposed internal notches 28, 29 to cause the rotor to maintain a rest position as known in the prior art.

Frame 1 includes stator locating means, which include the wall 21, and raised bosses 30, 31 in the plastic frame.

In accordance with the present invention, the frame is molded so that the wall 21 and portions of the frame are removed at diametrically opposite positions to provide two holes 32, 33 which extend all the way through the frame and which are also larger than the narrow sections 27, 28 of the stator. Holes 32, 33 are spanned by narrow stator sections 26, 27, respectively.

The first manufacturing step comprises locating and attaching the stator to the frame. Preferably this is done by application of an adhesive, such as epoxy, to the bottom surface of stator 10, which is placed in the frame, locating it as shown by means of bosses 30, 31 and wall 21. The bosses 30, 31 and wall 21 serve as stator locating means. However, other means of attachment such as ultrasonic welding may be employed.

Figure 4:
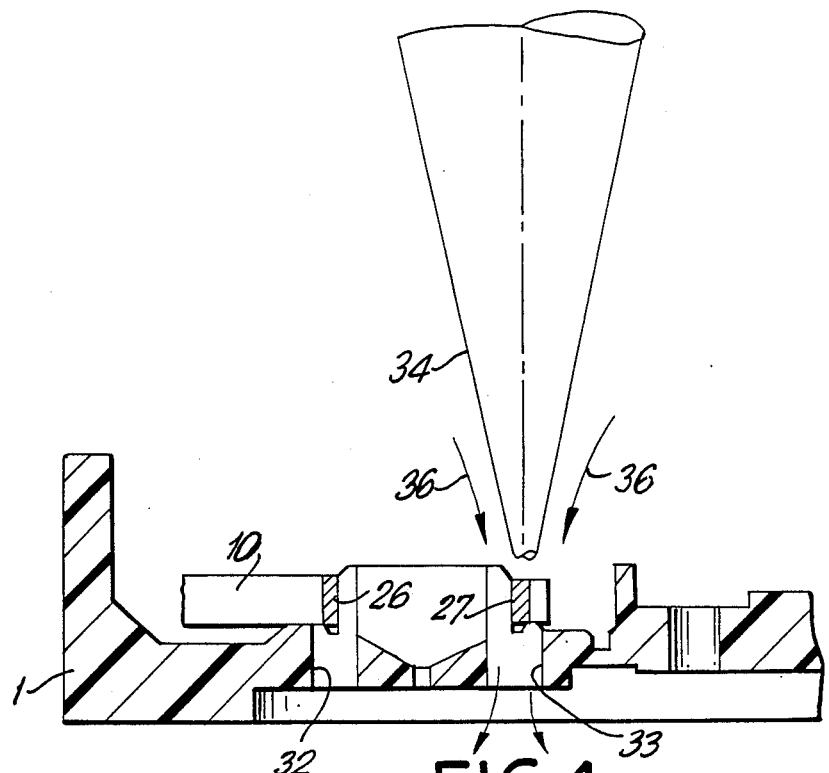
Figure 5:
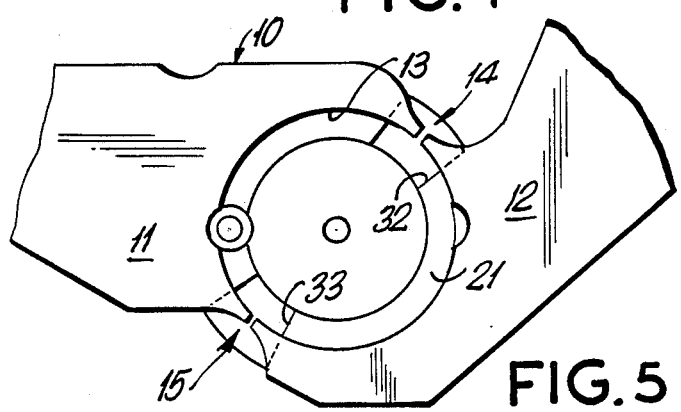

After the adhesive has cured and the stator is secured in the frame, the narrow sections are severed to divide the stator into two members by means of a laser, as shown in the cross-section view of FIG. 4. A laser beam 34 is provided by a commercially obtainable laser cutting apparatus and focused on each narrow section of the stator in turn. Such apparatus may consist of a pulsed solid-state laser manufactured by Haas-Laser GmbH which, with suitable beam source, focusing optics and output power will serve to vaporize the metal in the narrow sections 26, 27, leaving a spacing or gap between them on the order of 0.1 mm. It has been found that the operating performance of the stepping motor is significantly improved by replacing the narrow sections 26, 27 with an air gap. During the laser cutting process, air jets 36 may be employed as shown in FIG. 4 to remove the vaporized metal and direct it through holes 32, 33 away from the frame. Holes 32, 33 allow the stator to be located by the frame itself and severed without damage to the plastics frame. FIG. 5 is an enlarged view illustrating how the severed section ends are now separated by air gaps.

Figure 6:
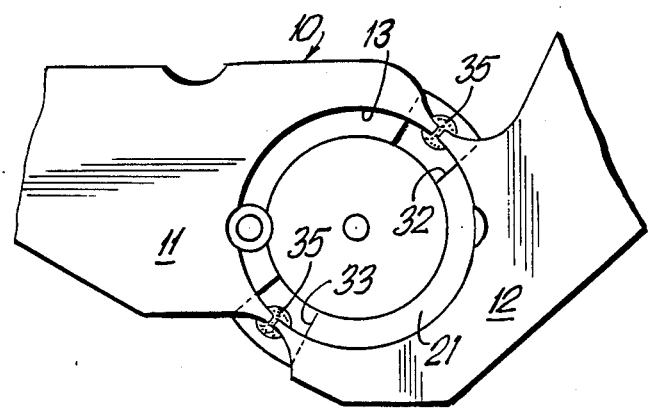

The next step in the manufacturing method consists of applying a plastic plastic fixation such as drops of curable epoxy 35 over the air gap locations 14, 15, so as to encapsulate and re-join the severed sections. Since plastic has a magnetic permeability roughly equal to that of air, the magnetic effect of the epoxy 35 is negligible. This further and finally fixes the stator in position and prevents migration of any metal droplets or particles left over from the cutting process. As shown in FIG. 6, the epoxy 35 bridges the gap and fixes the severed sections against movement during assembly or future use.

Subsequent steps in the manufacturing method are to secure the coil core assembly on top of the severed stator members 11, 12, and to assemble the rest of the movement as previously described.

Several important advantages are obtained by use of our improved method.

One advantage of the described method is that compared to the one piece stator arrangement, where a stator material of lower magnetical saturation must be used to avoid requirement of too high a percentage of magnetic flux to saturate the narrow connection portions 26, 27, which causes losses. Our two piece stator manufacturing method allows the use of soft magnetic material having higher magnetic permeability. This is important, since a smaller minimum cross-section of the stator is possible and therefore a smaller size motor can be made with the described method.

Preferably, the stator material is the same as that used in the coil core, which allows standardization of raw material and manufacturing processes, such as heat-treatment, etc.

Another advantage is that the extremely narrow and delicate reduced cross section areas of the present one-piece stator can be made much wider, 0.2 to 0.3 mm, instead of the previous 0.1 mm. This is a compromise between the mechanical minimum stability and the loss of magnetic flux. It is very difficult to keep the circularity (ovality) of the rotor centerhole 13 within a few microns and to avoid bending or deformation of the flat stator 10.

It should also be noted that the final fixation and sealing operation with a small drop of epoxy applied to the laser-cut gap is of substantial importance for improving reliability. It not only encapsulates all remaining particles from laser cutting, but mainly accomplishes the final positioning and fixation of the two stator parts right at the most sensitive functional position around the rotor axis. Shock testing shows that this is a very effective way to secure the required efficiency of the motor.

While there has been described what is considered to be the preferred embodiment of the invention, other modifications will occur to those skilled in the art, and it is desired to secure in the appended claims all such modifications as fall within the true spirit and scope of the invention.

We claim:

1. Method for making a timepiece stePping motor comprising:
   providing a flat one-piece stator member defining an opening for a rotor and having a pair of diametrically opposed narrow sections on either side of said opening,
   providing a movement frame of plastic material having stator locating means and defining a pair of holes larger than said narrow sections extending through said movement frame,
   locating and attaching said stator to said frame so that said narrow sections span said holes,
   cutting said narrow sections with a laser to sever the stator into two members, and to define gaps therebetween and,
   attaching a coil core assembly member to said stator members and in magnetic circuit therewith.

2. The method according to claim 1, further including the step of directing a flow of gas across said narrow sections while cutting with a laser to remove metal vapor through said holes in the movement frame without damaging said plastic frame material.

3. The method according to claim 5, wherein the stator is attached to the frame with an adhesive and wherein said encapsulating step includes applying an epoxy plastic to encapsulate the severed ends of said narrow sections and to bridge said gaps left therebetween.

4. The method according to claim 1, wherein said stator locating means in the movement frame comprises an integral wall formed as part of the frame and extending through said stator opening, and wherein said pair of holes are partially defined in said wall.

5. The method according to claim 1, further including the step of encapsulating and rejoining said narrow sections with a plastic fixation.

* * * * *